(12) United States Patent
Redman et al.

(10) Patent No.: US 6,841,639 B1
(45) Date of Patent: Jan. 11, 2005

(54) POLYMER SOLUTIONS (75) Inventors: Richard Paul Redman, Surrey (GB); Laurence Gerald Hughes, Surrey (GB); Richard Neil Templar Freeman, Surrey (GB); Andrew Lennard Lewis, Surrey (GB)

(73) Assignee: Biocompatibles UK Limited, Surrey (GB)

( * ) Notice: Subject to any disclaimer, the term of this patent is extended or adjusted under 35 U.S.C. 154(b) by 306 days.

(21) Appl. No.: 09/979,682

(22) PCT Filed: May 30, 2000

(86) PCT No.: PCT/GB00/02078

§ 371 (c)(1),
(2), (4) Date: Nov. 26, 2001

(87) PCT Pub. No.: WO01/09208

PCT Pub. Date: Feb. 8, 2001

(30) Foreign Application Priority Data

May 27, 1999 (EP) .............................. 99304092

(51) Int. Cl.⁷ ............................ C08F 230/02; C08F 2/08
(52) U.S. Cl. ........................... 526/277; 526/79; 526/80; 526/278; 528/501; 427/372.2; 427/385.5
(58) Field of Search .................. 526/79, 80, 277, 526/278; 528/501; 427/372.2, 385.5

(56) References Cited

U.S. PATENT DOCUMENTS

| | | | | |
|---|---|---|---|---|
| 5,648,442 A | | 7/1997 | Bowers et al. ............... | 526/277 |
| 5,705,583 A | * | 1/1998 | Bowers et al. ............... | 526/277 |
| 5,712,326 A | | 1/1998 | Jones et al. .................. | 523/105 |
| 5,977,257 A | * | 11/1999 | Waki et al. ................... | 525/131 |
| 6,087,462 A | | 7/2000 | Bowers et al. ............... | 526/277 |
| 6,150,432 A | | 11/2000 | Jones et al. .................. | 523/105 |
| 6,214,957 B1 | * | 4/2001 | Shiino et al. ................ | 526/278 |

FOREIGN PATENT DOCUMENTS

| | | |
|---|---|---|
| JP | 3-39309 | 2/1991 |
| WO | 93/01221 | 1/1993 |
| WO | 95/05408 | 2/1995 |
| WO | 98/22516 | 5/1998 |

OTHER PUBLICATIONS

Ishihara, K., et al., Polymer Journal (1990) 22(5), 355–360 (published Aug.1990) "Preparation of phospholipid polymers and their properties as polymer hydrogel membranes".

Kobunshi Ronbunshu, Jul. 1978, 35(7) 423–427. "Synthesis and Hemolysis Test of the Polymer Containing Phosphorylcholine Groups".

Kobunshi Ronbunshu, Dec. 1983, 40(12) 785–793. "Interaction between the Polymer Containing Phosphorylcholine Group and Cells".

Sakurai, I., et al., Macromolecules (1992), 25, 7256–7260, "Structure of the condensed phase of methacrylic copolymers with lipidic side chains".

Park S M, et al., Journal of Korean Fiber Society. Oct. 1992, 29(10) 32–37 "Studies on bicompatible membranes (1)".

Ishihara, K., et al., Journal of Biomedical Materials Research. (1990), 24(8), 1069–1077 (published Aug. 1990) "Reduced thrombogenicity of polymers having phospholipid polar groups".

* cited by examiner

*Primary Examiner*—Tae H. Yoon
(74) *Attorney, Agent, or Firm*—Sughrue Mion, PLLC (57) ABSTRACT

Copolymers of zwitterionic monomer, especially 2-methacryloyloxyethyl-2'-trimethylammoniumethyl phosphate inner salt, and hydrophobic comonomer, especially dodecylmethacrylate, are made in a monomer starved polymerization process in which solutions of monomers are fed to the reaction vessel in which initiator is present over an extended period. The copolymers have improved compositional uniformity and provide better coatings on a range of substrates. The novel copolymers can be distinguished from prior art batch type bulk solution polymerization polymers of the same monomer composition by solubility characteristics especially in alcohol/water mixtures. Particularly preferred coating compositions comprise an alcohol:water mixture containing around 20 to 40% by volume alcohol.

42 Claims, 4 Drawing Sheets

POLYMER SOLUTIONS

The present invention relates to biocompatibilising zwitterionic polymers of improved solubility, processes for synthesising them, coating solutions and coating processes. The polymers are formed from ethylenically unsaturated monomers including a zwitterionic monomer and a hydrophobic monomer.

In WO-A-93/01221 we describe coating polymers formed from ethylenically unsaturated monomers including 2-methacryloyloxyethyl-2'-trimethylammoniumethyl phosphate inner salt (HEMA-PC), and a surface binding monomer for coating substrates to improve their biocompatibility, especially haemocompatibility. Surface binding monomers include hydrophobic monomers suitable for binding to hydrophobic surfaces. One such monomer copolymerisable with HEMA-PC is lauryl methacrylate (n-dodecylmethacrylate). Examples of copolymers include 1:2 and 1:3 copolymers of HEMA-PC and dodecylmethacrylate.

Such copolymers are synthesised by a batch-type (one-pot) bulk solution polymerisation technique, in which the monomers are dissolved in a solvent system which is a solvent for both the monomers and for the polymer. The polymerisaton solvent system is, for instance, methanol/tetrahydrofuran (5:9), or propan-2-ol ethylacetate (17:43 volume or 1:1 volume). The polymerisation is initiated after all the monomers are dissolved in the reaction vessel. The polymer is recovered by precipitation from acetone. The polymer is dissolved to form a coating composition, the solvent for the coating composition being, for instance, ethanol/chloroform or propan-2-ol (isopropanol, (IPA)).

For some substrates, the solutions described in that earlier specification result in uneven coatings. We have also found another problem that the use of certain solvent systems for the coating compositions may adversely effect certain substrates. For instance, the use of chlorinated alkanes may have a deleterious effect on the underlying substrate on many substrates, eg membranes and other, porous substrates. Even the use of alcohols may have undesirable effects on some substrates such as porous substrates or substrates which swell in alcohol.

In WO-A-98122516 we describe terpolymers of HEMA-PC, dodecylmethacrylate (or other hydrophobic comonomer) and a cationic comonomer. The polymerisation process was carried out by two different techniques. One technique used a similar process to that described in WO-A-93/01221, in which a bulk solution polymerisation was carried out in a solvent system, all of the monomers being included in the reaction vessel at the start of the polymerisation process (the one-pot method). In the second method, a polymerisation solvent comprising n-propanol in a reaction vessel was heated. To the heated solvent was added, drop wise, a cold mixed solution of the monomers in n-propanol and initiator. After all the monomer had been added, additional initiator was added and the vessel maintained at the raised temperature for a further period of time. The polymer was recovered by evaporation of the solvent, dissolution in a mixture of dichloromethane and methanol followed by precipitation in acetone. This process was termed the monomer feed process.

In a new polymerisation process according to the invention, ethylenically unsaturated monomers consisting substantially only of:

a) 1 part by mole zwitterionic mono mer of the general formula I in which
n is 2 to 24;
m is 0 to 20;
of the groups $R^1$, one may be methyl or hydrogen and the rest are all hydrogen; and
X is a zwitterionic group; and b) 1 to 10 parts by mole hydrophobic comonomer of the general formula II in which
p is 1 to 24, are copolymerised in solution in a solvent system in which the monomer mixture and the polymer are soluble, in which process the monomers dissolved in a monomer solvent are fed constantly over a monomer feed phase into a reaction vessel containing solvent comprised in the said solvent system and radical initiator under conditions at which polymerisation takes place, at a predetermined monomer feed rate whereby the molar ratio of zwitterionic monomer to hydrophobic comonomer in the reaction vessel is maintained substantially constant (±10%) throughout the monomer feed phase.

The zwitterionic monomer of the formula I is extremely hydrophilic. If the chain between the methacyloyloxy group and the zwitterionic group X contains (oligo)alkyleneoxy moieties, that is m is other than 0, it is preferred that the groups $R^1$ are all hydrogen. In such compounds, m is preferably in the range 1 to 10, most preferably 1 to 5. It is, however, preferred that m is 0. Furthermore it is preferred that n is 6 or less, most preferably 4 or 3 or, most usefully, 2.

The process is of particular utility where the hydrophobic comonomer is highly hydrophobic. The value of p is preferably at least 4, more preferably at least 6, for instance up to 18, most preferably in the range 8 to 16, for instance 12. Although the group $C_pH_{2p+1}$ may be a branched alkyl, it is preferred that it is a straight chain alkyl group of the formula $(CH_2)_pH$.

In the zwitterionic monomer the general formula I, the zwitterionic group X preferably has the general formula III in which the moieties $A^2$ and $A^3$, which are the same or different, are —O—, —S—, —NH— or a valence bond, preferably —O—, and $W^+$ is a group comprising an ammonium, phosphonium or sulphonium cationic group and a group linking the anionic and cationic moieties which is preferably a $C_{1-12}$-alkanediyl group, preferably in which $W^+$ is a group of formula —$W^1$—$N^+R^2_3$, —$W^1$—$P^+R^3_3$, —$W^1$—$S^+R^3_2$ or —$W^1$-Het$^+$ in which:

$W^1$ is alkanediyl of 1 or more, preferably 2–6 carbon atoms optionally containing one or more ethylenically unsaturated double or triple bonds, disubstituted-aryl (arylene), alkylene arylene, arylene alkylene, or alkylene aryl alkylene, cycloalkanediyl, alkylene cycloalkyl, cycloalkyl alkylene or alkylene cycloalkyl alkylene, which group $W^1$ optionally contains one or more fluorine substituents and/or one or more functional groups; and either the groups $R^2$ are the same or different and each is hydrogen or alkyl of 1 to 4 carbon atoms, preferably methyl, or aryl, such as phenyl, or two of the groups $R^2$ together with the nitrogen atom to which they are attached form an aliphatic heterocyclic ring containing from 5 to 7 atoms, or the three groups $R^2$ together with the nitrogen atom to which they are attached form a fused ring structure containing from 5 to 7 atoms in each ring, and optionally one or more of the groups $R^2$ is substituted by a hydrophilic functional group, and the groups $R^3$ are the same or different and each is $R^2$ or a group $OR^2$, where $R^2$ is as defined above; or Het is an aromatic nitrogen-, phosphorus- or sulphur-, preferably nitrogen-, containing ring, for example pyridine.

Most preferably, the zwitterionic group of the formula III, has the general formula IV:

IV where the groups $R^4$ are the same or different and each is hydrogen or $C_{1-4}$ alkyl, and q is from 1 to 4, in which preferably the groups $R^4$ are the same preferably methyl.

Alternatively, the zwitterionic group may be a betaine group (ie in which the cation is closer to the backbone), for instance a sulpho-, carboxy- or phospho-betaine. A betaine group should have no overall charge and is preferably therefore a carboxy- or sulpho-betaine. If it is a phosphobetaine the phosphate terminal group must be a diester, i.e., be esterified with an alcohol. Such groups may be represented by the general formula V

V in which $A^4$ is a valence bond, —O—, —S— or —NH—, preferably —O—;

V is a carboxylate, sulphonate or phosphate diester (monovalently charged) anion;

$R^4$ is a valence bond (together with $A^4$) or alkanediyl, —C(O)alkylene- or —C(O)NHalkylene preferably alkanediyl, and preferably containing from 1 to 6 carbon atoms in the alkanediyl chain;

the groups $R^6$ are the same or different and each is hydrogen or alkyl of 1 to 4 carbon atoms or the groups $R^1$ together with the nitrogen to which they are attached form a heterocyclic ring of 5 to 7 atoms; and $R^7$ is alkyanediyl of 1 to 20, preferably 1 to 10, more preferably 1 to 6 carbon atoms.

One preferred sulphobetaine monomer has the formula VI

VI where the groups $R^{15}$ are the same or different and each is hydrogen or $C_{1-4}$ alkyl and s is from 2 to 4.

Preferably the groups $R^8$ are the same. It is also preferable that at least one of the groups $R^8$ is methyl, and more preferable that the groups $R^8$ are both methyl.

Preferably s is 2 or 3, more preferably 3.

Alternatively the zwitterionic group may be an amino acid moiety in which the alpha carbon atom (to which an amine group and the carboxylic acid group are attached) is joined through a linker group to the backbone of the biocompatible polymer. Such groups may be represented by the general formula VII

VII in which $A^5$ is a valence bond, —O—, —S— or —NH—, preferably —O—, $R^9$ is a valence bond (optionally together with $A^5$) or alkanediyl, —C(O)alkylene- or —C(O)NHalkylene, preferably alkenediyl and preferably containing from 1 to 6 carbon atoms; and the groups $R^{10}$ are the same or different and each is hydrogen or alkyl of 1 to 4 carbon atoms, preferably methyl, or two or three of the groups $R^{10}$, together with the nitrogen to which they are attached, form a heterocyclic ring of from 5 to 7 atoms, or the three group $R^{10}$ together with the nitrogen atom to which they are attached form a fused ring heterocyclic structure containing from 5 to 7 atoms in each ring. The zwitterionic monomer and hydrophobic comonomer are preferably used in the polymerisation in weight ratios in the range 1:(1–10), preferably 1:(1.5–4).

The polymer produced in the process has the following general formula VIII

VIII in which n, m, $R^1$ and X are as defined in relation to the general formula I, p is as defined in relation to general formula II, t is 1 and u is 1 to 10.

u is preferably in the range 1.5 to 5. Preferably t:u is substantially the same as the mole ratio of monomers used in the polymerisation process.

In the polymerisation process, the polymerisation solvent system is selected such that the zwitterionic monomer, which is generally highly hydrophilic, and the hydrophobic comonomer co-dissolve, and so that the polymer is retained in solution at the end of the polymerisation. Suitable solvents include lower alkanols including glycols, alkanoates and admixtures of alcohols or ethers with esters such as lower alkyl-lower, as well as ethers including glycol ethers. Examples of alcohols, which include glycols, are methanol, ethanol, propan-2-ol, propan-1-ol, and butanol. Examples of ethers are tetrahydrofuran and diethylether. Examples of esters are ethyl, propan-1-yl, and propan-2-yl acetate. Often mixtures of solvents are used to form the polymerisation solvent system. For example mixtures of alcohols and esters are found to be convenient. Whilst esters alone tend not to be solvents for the polymers their presence in minor amount in the product mixture improves the recover step. One particularly preferred combination is a major amount of propan-2-ol and a minor amount of propan-2-yl acetate. For instance mixtures of alcohol to ester may be in the range 10:1 to 1.5:1 by weight, most preferably in the range 5:1 to 2:1.

The polymerisation solvent system is made up of solvent added to the reaction vessel prior to addition of monomer, any solvent in which the monomers and/or initiator are dissolved and, if necessary, solvent added throughout the polymerisation in parallel with monomer addition, or after the monomer feed phase is complete. The solvent in the reaction vessel prior to commencement of the monomer feed phase may be the same as or different in composition to the solvent in the monomer solutions. Preferably it consists of the same components, in the same or a different ratio.

The monomers may be fed into the reaction vessel as a mixed solution or separate solutions, one containing each of the monomers, may be fed simultaneously to the reaction vessel. If the monomers are added separately, the two monomer solutions may be added at substantially constant rates and consequently constant ratios of one monomer to the other or the ratio of the rates of addition may be adapted so as to maintain a constant ratio of monomers in the polymerisation vessel. It is most convenient, and good results are achieved, where the monomers are mixed together before being added to the polymerisation vessel. Generally a reservoir of the premixed monomer is generated and the mixed monomer solution fed from that reservoir into the reaction vessel. Alternatively, separate solutions of the two monomers may be premixed immediately before addition to the reaction vessel, such that the ratios of the monomers may be controlled and changed throughout the polymerisation process if desired.

Generally the monomer solution(s) when they are added to the reaction vessel are at ambient temperature. It is convenient for the polymerisation mixture in the polymerisation vessel to be at a raised temperature, generally a constant temperature throughout the polymerisation process. It is particularly convenient for the vessel to be kept at reflux, to provide a substantially constant temperature. The reaction vessel is generally at atmospheric pressure. The choice of polymerisation solvent system may further be dependent upon a suitable reflux temperature. Generally the reaction temperature is in the range 45 to 120° C., most preferably in the range 60 to 100° C., for instance in the range 80 to 90° C.

The free radical initiator used in the polymerisation process is preferably a thermal initiator. Provided the reaction temperature of the initiator is higher than ambient, it is convenient for the initiator to be co-dissolved into the or one of the monomer solutions. The initiator is selected such that initiation takes place in the reaction vessel, usually at the temperature in the polymerisation vessel. A suitable thermal initiator is o-azo-isobutyronitrile (AIBN), bis(4-tert.butycyclohexyl)peroxydicarbonate or tert.butylperoxypivalate. Alternatively it is possible to use a redox initiation system, in which one component of the system is present in the reaction vessel and the other is added simultaneously, for instance co-dissolved, with the monomer solution(s). The initiator is for instance used in a total amount in the range 0.05 to 2%, preferably 0.1 to 1% by weight based on the weight of monomers.

The polymerisation process is carried out under monomer starved conditions. The prime determinant of the rate of polymerisation is the rate at which the monomers are added. Thus the rate of consumption of monomers in the polymerisation vessel is substantially the same as the rate of addition of monomers to the vessel. This results in the monomer ratio remaining substantially constant throughout the monomer feed stage, at the end of which polymerisation is close to completion, for instance at least 90% complete, for instance at least 95% complete as judged by residual monomer. It is, nevertheless, preferred for polymerisation to be continued for a period after monomer feed is complete. This results in reduction of residual monomer to very low levels.

The polymer product preferably has a molecular weight in the range 20,000 to $10^6$, preferably 50,000 to $10^6$, more preferably in the range $(1–5) \times 10^5$ D.

Following completion of polymerisation, polymer is recovered from the product mixture by steps including precipitation of the polymer into a non solvent precipitation liquid. It may be desirable for the polymerisation solvent system to be removed in part or substantially completely, from the product mixture before contact with the precipitation liquid but it is generally found to be advantageous for the product mixture to be directly mixed with the precipitation liquid. Where the polymerisation solvent system is evaporated completely, it is necessary to redissolve the polymer prior to precipitation. A suitable precipitating liquid is acetone.

Preferably the polymerisation solvent is retained in the precipitation step since this optimises maintenance of copolymerised monomer and low molecular weight polymer in the liquid phase. Preferably the product mixture and precipitation liquid are added concurrently over the same period to a recovery vessel. This process allows the maintenance of a substantially constant ratio of precipitation liquid to polymerisation solvent, which optimises the isolation process. To improve the isolation the precipitation may be repeated after redissolution of the polymer in a suitable solvent. Preferably there is concurrent addition of the polymer solution and precipitation liquid to a recovery vessel.

We generally find that the yield of the polymerisation reaction and recovery stages is high, indeed at least as high as the prior art one-pot process, for instance more than 80 or 85% after two precipitations.

Th process of the invention results in production of polymers having very low compositional variation. The zwitterionic monomers and hydrophobic comonomer having different reactivity constants, will normally polymerise at different rates. Furthermore, the monomers tend to react with growing polymer chains having end groups of the same type rather than a different type, thereby forming blocky copolymers. The polymers of the present invention tend to have a much lower compositions variation on a molecular and sub-molecular scale.

Physical and chemical characterisation of the copolymer formed by the polymerisation process of the invention as compared to that produced by the "one-pot" process of WO-A-93/01221, by spectroscopic analysis (NMR, IR, UV-visible) analysis, thermal analysis (DSC, TGA) and molecular weight determinations by gal permeation chromatography, do not allow discrimination of the two polymers. We have found, however, that the polymers can be distinguished on the basis of solubility parameters in selected analytical polymer solvent systems.

Combination of a very hydrophilic monomer such as HEMA-PC, with a hydrophobic monomer such as dodecylmethacrylate will lead to an amphiphilic polymer with unusual solubility properties. Any solvent in which the polymer is to be dissolved, for instance for use in a coating process, must be able to solvate both the zwitterionic head group and the long alkyl chains. We have demonstrated by use of NMR that mixed solvent systems using miscible solvents with different polarities allows optimum solvation of the polymer. Where the polymer is produced by the prior art one-pot process and is relatively blocky, the use of lower alkanols inadequately solvates the hydrophobic regions of the polymer. Using higher alkanols can solvate the prior art copolymers adequately but is disadvantageous in that solvent removal from the wet coating requires higher temperature and/or longer times or is difficult to drive to completion. Coating formation may be unsatisfactory due to high viscosity.

Our investigations have shown that the prior art copolymers form hazy solutions in lower alkanols such as methanol, ethanol and isopropanol. The haze is caused by a fine suspension of undissolved particulate matter which can be isolated and shown to consist polymer which contains a high ratio hydrophobic group to hydrophilic group. Whilst the use of a solvent system comprising a mixture of a chlorinated alkane and an alcohol such as used in the prior art mentioned above may provide adequate salvation of the blocky copolymers of the prior art, the use of chlorinated solvents is generally undesirable from an environmental point of view. Also certain substrates may be adversely affected by such solvents.

The polymers made by the new polymerisation process of the invention can thus be understood to be different to those produced by the prior art. The examples below provide further data showing the difference between the polymers. The novel polymers have particularly desirable properties for coating a wide range of substrates. The present invention comprehends coating compositions comprising a solution of the novel polymer in a coating solvent system. The coating solvent system may comprise alcohols, esters or ethers and alkanes, and mixtures thereof. Binary mixtures of miscible solvents may be used such as of an alcohol and an alkane, or an alcohol and water. Alcohols include $C_{1-10}$-alkanols, especially methanol, ethanol, propan-1-ol, propan-2-ol, butan-1-ol, butan-2-ol, hexanol and octanol. Alkanes include $C_{5-8}$-alkanes, which may be straight chain, branched or cyclic, for instance n-pentane, n-hexane, n-heptane and cyclohexane. Mixtures of solvents may be in a ratio of 10:1 to 1:10, for instance in the range 5:1 to 1:5 by volume.

In a second aspect of the invention, there are provided novel solutions of copolymers of a zwitterionic monomer of the general formula I and a hydrophobic comonomer of the general formula II in ratios (based on monomer) in the range 1:(1–5), (1.5–3) and having a propan-2-ol (IPA): water solubility characteristic such that the polymer is substantially insoluble in mixtures of 0–5% IPA, substantially wholly soluble at 20 to 40% IPA and at 100% IPA, and substantially insoluble at 60–90% IPA, the copolymer in the novel solution being at a concentration in the range 1 to 200 mg/ml in a solvent system comprising a mixture of miscible liquids each having a vapour pressure of at least 1 kPa at 25C the solution having a turbidity of less than 50 NTU.

Solubility in this aspect of the invention is determined by a turbidity test in which a 20 mg/ml solution is tested in a Genway Turbidimeter 605 and the turbidity recorded. Turbidity of the novel solution is also tested in this device.

A polymer having the above solubility characteristics will be suitable for coating substrates subsequently to be used in aqueous environments, to provide adequate coating stability on the substrate. The copolymers, being substantially wholly soluble in the range 20–40% volume IPA is a result of low blockiness, improved random distribution of monomers in the polymer. The copolymers also tend to be substantially wholly soluble in 100% IPA, possibly due to a particular conformation of polymer in a substantially non-hydrated form. In the intervening IPA contents, in the range 60–90%, the polymer is insoluble.

In this aspect of the invention the zwitterionic monomer is preferably selected from monomers of the formula I in which m is 0, n is 2, and x is a group of formula III, preferably in which $A^2$ and $A^3$ are —O— and W is —$W^1$ $NR^2_3$. More preferably x is a group of formula IV. In the hydrophobic comonomer, p is preferably 4 to 18, more preferably 8 to 16 and $C_pH_{2p+1}$ is straight main.

The copolymer in the novel solution defined by the solubility characteristics in the isopropanol:water mixed solvent system, has particularly desirable coating characteristics. The copolymers, when coated from a coating solvent system in which they are wholly dissolved, provide smooth uniform coatings with extremely good biocompatibility performance.

Whilst the coating composition may comprise other solvent systems, it is preferred that they consist of water:alcohol mixtures. The alcohol may be methanol, but is preferably a $C_{2-4}$-alcohol, more preferably selected from ethanol and isopropanol. The solvent system preferably is a mixture of water and isopropanol in a proportion at which the copolymer is substantially wholly soluble, and at a concentration in which the polymer is fully dissolved. Preferably the concentration of the copolymer in the coating composition is in the range 1–200 mg/ml, most preferably in the range 5–50 mg/ml, for instance 10–20 mg/ml. Preferably the ratio of alcohol:water is in the range (99–1): 1, more preferably (20–3):1.

We have found that, by using the novel copolymers, it is possible to provide water alcohol solutions with high water contents, for instance at least 50%, most preferably at least 80% water by volume. The polymers are nevertheless found to be stably adherent when coated onto hydrophobic substrates which are then used in aqueous environments. The solutions with high water contents are found to be particularly useful for coating substrates which would be harmed by higher concentrations of alcohol or by other organic solvent systems. Such substrates, which are sensitive to coating systems include membranes, and other porous substrates.

In a third aspect of the invention, there is provided an aqueous/alcoholic solution of a copolymer of a zwitterionic monomer of the formula I and a hydrophobic comonomer of the formula II at a molar ratio in the range 1:(1.5 to 10) in a solvent consisting of a mixture of an alcohol and water in a volume ratio in the range 10:1 to 1:5, the alcohol and its level being selected such that a 20 mg/ml solution of the polymer has a turbidity of less than 50 NTU.

The solution itself preferably has a turbidity value less than 50 NTU, preferably less than 20 NTU.

The alcohol may be a glycol or a polyol, but is preferably a monobasic alcohol. The alcohol preferably has a vapour pressure at 25C of at least 0.1, preferably at least 1.0, for instance at least 2.0 up to 20 Pa, preferably in the range 5 to 20 kPa. Suitable alcohols are methanol, ethanol, propan-1-ol, propan-2-ol, butan-1 , butan-2-ol, methyl-1-propanol, methyl-2-propanol, pentan-2-ol, pentan-1-ol, hexan-1-ol and hexan-2-ol. Particularly preferred is propan-2-ol (vapour pressure 6.02 kPa at 25C).

In a fourth aspect of the invention, there is provided a coating solution of a copolymer formed from zwitterionic monomer of the general formula I and hydrophobic comonomer of the general formula II in molar ratios in the range 1:(1–10) in a coating solvent system comprising a mixture of a $C_{5-10}$-alkane and a $C_{1-10}$-alkanol in a volume ratio in the range 1:(0.1–10).

Suitable ratios of the alkane and alcohol are 1:5 to 5:1.

The aqueous-alcoholic solution and the coating solution are preferably substantially clear, that is have a turbidity value, of less than 50 NTU's. The solutions preferably have a polymer concentration in the range 1–200 mg/ml, preferably in the range 5–50 mg/ml, for instance in the range 10–20 mg/ml, in the solvent system.

The coating composition is used in a novel coating process in which a substrate is coated with the solution, and the solvent is removed from the coating by evaporation to leave a polymer coated surface.

Suitable alkanes are $C_{5-8}$-branched, straight or cyclic alkanes, especially $C_{6-8}$-alkanes, for instance n-hexane, n-heptane and cyclohexane. The alcohol is selected so as to be wholly miscible with the alkane. Suitable alcohols are mentioned above in connection with the third aspect and are preferably selected from ethanol and isopropanol.

In the third and fourth aspect of the invention the polymer is preferably formed from preferred monomers as specified in connection with the second aspect of the invention. Preferably the monomer ratios are selected such that the polymer is insoluble in water (100%).

The novel solutions of the second, third or fourth aspect of the invention may be used in a novel coating process. In the coating process, removal of the is solvent may be conducted under application of heat and/or reduced pressure. The conditions are selected so as to minimise damage to the polymer and/or the substrate, to optimise the smoothness of the coating and to avoid high temperatures where inflammable solvent is present.

The following examples illustrate the invention.

EXAMPLE 1

Preparation of (2-methacryloyloxyethyl-2'-trimethylammoniumethyl phosphate, inner Salt)-co-(n-dodecyl methacrylate) 1:2 copolymer The zwitterionic monomer (48 g, 0.163 mole) (HEMA-PC) was weighed in a glove box environment dried by $P_2O_5$. Dodecylmethacrylate (laurylmethacrylate, LM) (82.8 g, 0.326 mole), and α-azo-isobutyronitrile (AIBN) initiator (0.2 g, 0.15%) were weighed in air. A 3 neck reaction flask, fitted with water condenser, nitrogen gas flow and monomer feed tubing, and primed with anhydrous isopropanol (isopropyl alcohol, IPA) (120 g) and isopropylacetate (40 g) solvent, was immersed in a heated 90° C. oil bath so that the solvent system is refluxing at a temperature of about 83° C. The monomers and initiator were dissolved in isopropanol (108 g) isopropylacetate (56 g) solvent and magnetically stirred in a measuring cylinder sealed with parafilm. The reaction mixture was drawn into polypropylene tubing placed inside the measuring cylinder and through silicone tubing via a peristaltic pump to enter the heated reaction vessel in a dropwise process. A complete transfer to the heated vessel took 2 hours. The reaction was stirred for another hour. A second charge of AIBN initiator (0.4 g), dissolved in isopropylacetate (6 g), was added and the reaction mixture was stirred for a further 2 hours, taking the total reaction time to 5 hours.

Once cooled to 40–60° C. temperature, the reaction mixture was pumped through a sintered glass filter and dropwise precipitated into 400 ml acetone and 40 ml isopropanol. Concurrently 2800 ml acetone was also pumped in over 1 hour. A white solid product settled from the acetone leaving a slightly cloudy supernatant. The supernatant was removed and the white solid is redissolved in 200 ml isopropanol. The precipitation is repeated using the same volumes and solvents and method of mixing. The product was separated by Buchner flask and 113 Whatman wet strengthened filter paper, and dried in a room temperature vacuum oven for up to 24 hours. The product was weighed (98 g) to provide a 75 wt % yield, bottled in a brown glass vial and refrigerated. The molecular weight was determined by gel permeation chromatography (GPC) using a Waters 717 Autosampler, a Waters 510 pump, an Asahipak GS<700 column and a Viscotek T60 light scattering detector and was found to be in the range $(2-6) \times 10^5$ D.

EXAMPLE 2

Copolymer Ratios 1:1 and 1:4

Using the polymerisation method of example 1, copolymers of the same zwitterionic monomer and hydrophobic comonomer were synthesised at molar ratios 1:1 and 1:4. Apart from the use of the different monomer ratios, the reaction conditions were identical were the solvents the same.

EXAMPLE 3

Solubility of Products of Monomer-Starved vs One-Pot Polymerisation

The copolymers produced in examples 1 and 2 and a one-pot copolymer of HEMA-PC and dodecylmethacrylate 1:2 made according to example 1 of WO-A-93/01221 in isopropanol:ethyl acetate 43:17, were subjected to comparative solubility tests. The polymers were dissolved, at a concentration of 20 mg/ml in various isopropanol:water mixtures, differing by their isopropanol-water composition. Briefly, the polymers were added to 100% alcohol. The appropriate amount of water was added to give the desired ratio of alcohol to water, and the mixture was shaken. If there was no precipitation the solution was then tested for its turbidity, in a Genway Turbidimeter device. The turbidity is recorded in NTU's.

Figure 1:
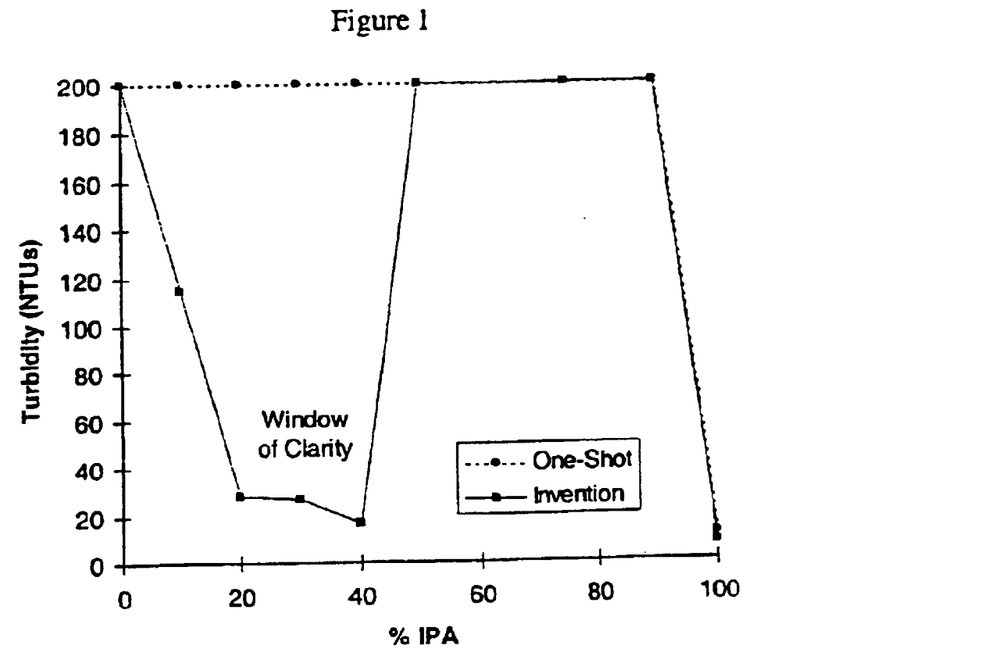
FIGS. 1 and 2 show the results of Example 3.
Figure 2:
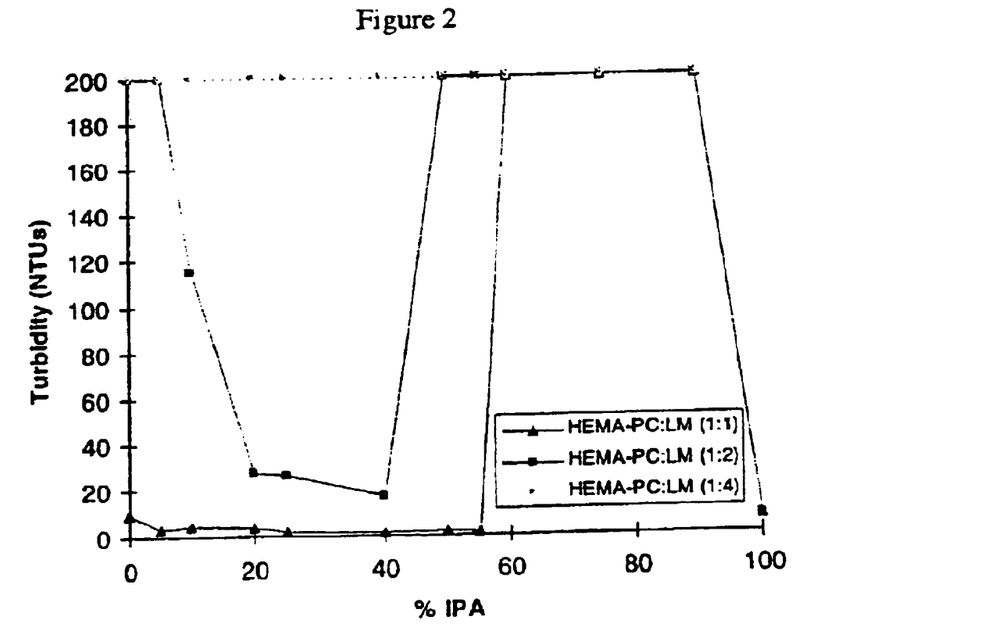

The results are shown in accompanying FIGS. 1 and 2. Whilst the graph shows values of up to 200 NTU, in fact the polymers having turbidity indicated as 200 NTU are insoluble and this value is chosen as an arbitrary value. The turbidity values determined in the Turbidimeter may not be precisely 200 NTU. FIG. 1 shows the difference in the solubility characteristics between the one-pot, comparison copolymer and the polymers of the invention formed in the monomer starved polymerisation process. The comparison polymer is insoluble in all ratios of water:isopropanol. The copolymer of the invention, by contrast, has a "window of clarity" for isopropanol contents in the range 20 to 40% by volume.

FIG. 2 shows that copolymers produced by the monomer starved process of the invention with high levels of hydrophobic comonomer may be substantially insoluble at all concentrations of water, though soluble in 100% isopropanol. For copolymers with high levels of the zwitterionic monomer, for instance 50 mole %, the polymers tend to be soluble at all levels of IPA less than 55 or 57% by volume and even in 100% water. Such copolymers would tend to be insufficiently stable on substrates for use in aqueous environments. The copolymer formed of a 1:2 mixture of zwitterionic monomer:hydrophobic comonomer, however, has a window of clarity at isopropanol contents in the range 20–40%, being insoluble in water and low water content mixtures. Such copolymers give adequate coating stability on hydrophobic substrates.

EXAMPLE 4

Monitoring of Residual Monomer in Monomer-Starved and One-Dot Method

Figure 3A:
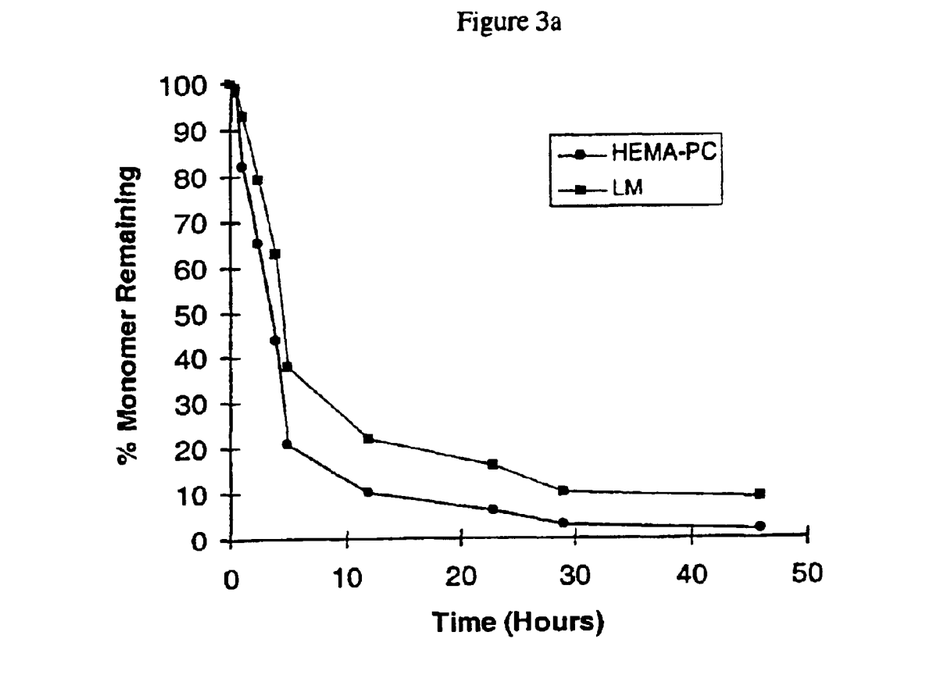
FIGS. 3a and 3b, 4 and 5 show the results of Example 4.
Figure 3B:
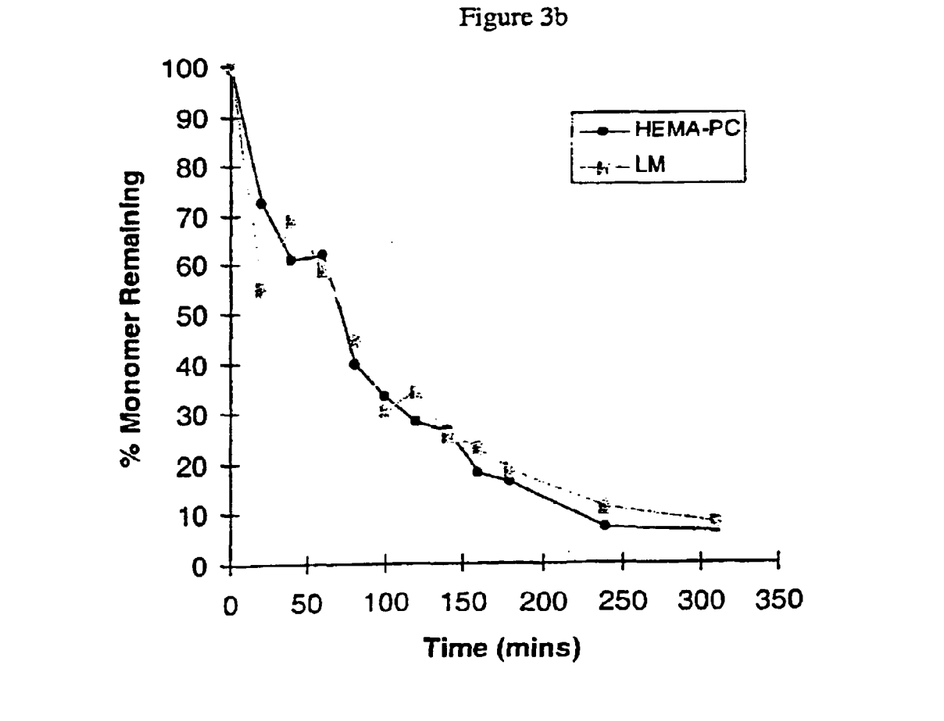
Figure 4:
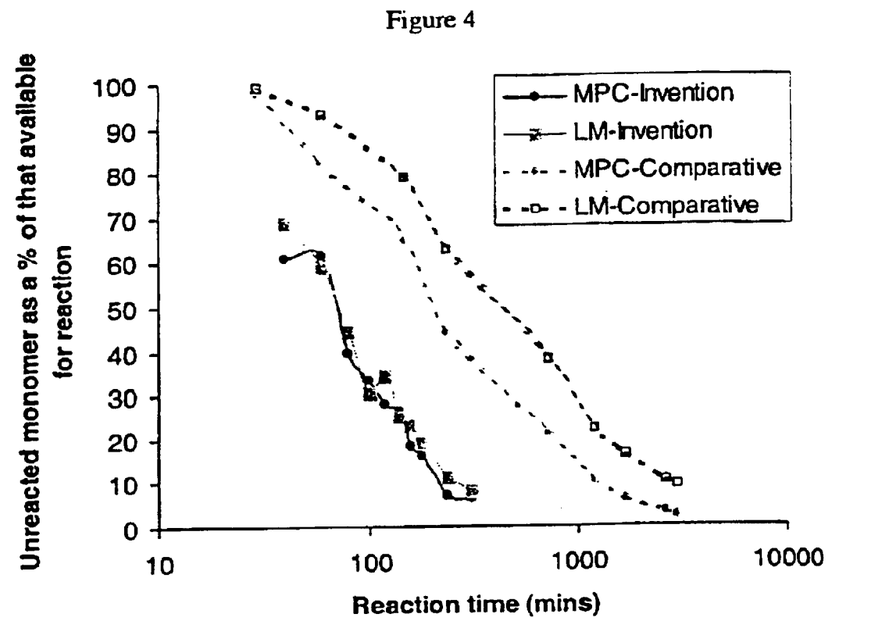

The one-pot method and monomer starved method of polymerisation for the 1:2 polymers of example 3 were monitored throughout their progress for residual monomer and reported as a percentage of the total monomer which had been added into the polymerisation mixture at the relevant time. The results are shown in FIGS. 3*a* and 3*b*, respectively. These plots have been combined and FIG. 4 shows the percentages of the individual monomers remaining as a function of time. A logarithmic scale is used for time, but it will be appreciated that the monomer feed process is far quicker, and has substantially the same yield. In the graphs, the HEMA-PC monomer is referred to as MPC.

Figure 5:
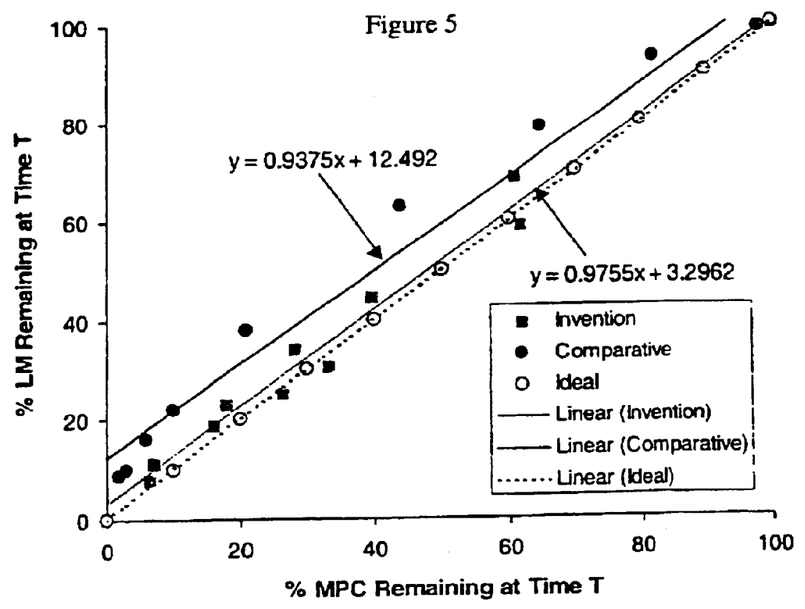
Figure 6:
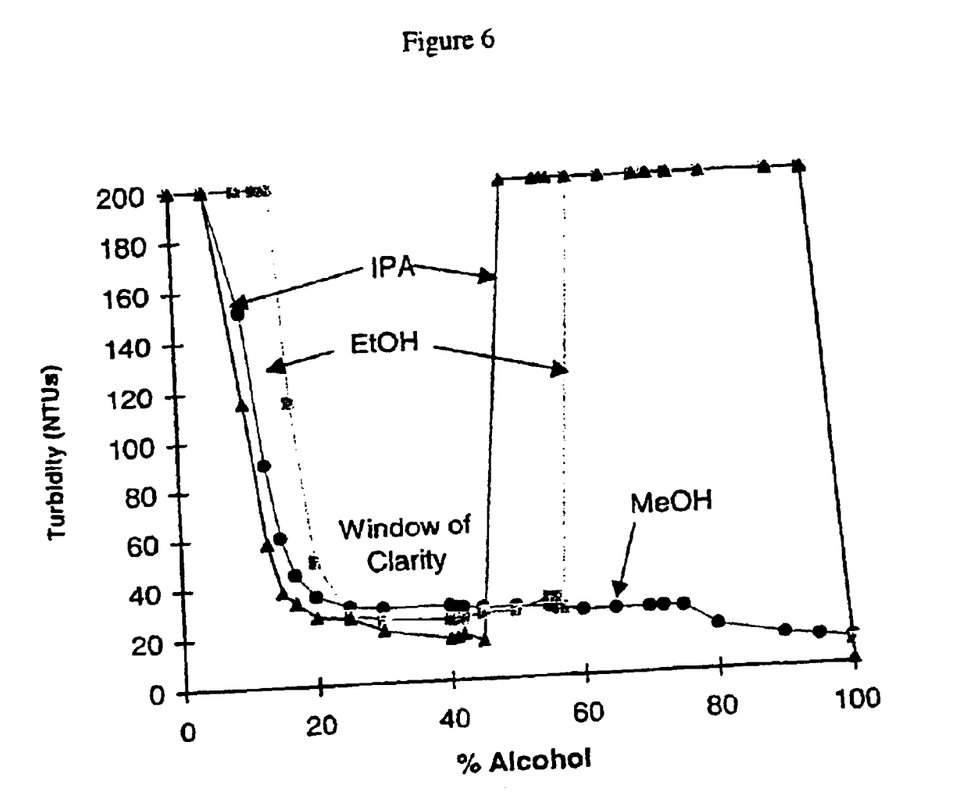
FIG. 6 shows the results of Example 5 below.

The results have also been replotted in FIG. 5 to show the % residual LM monomer against the % residual HEMA-PC (MPC) monomer at each time point. This indicates that the plot for the monomer-feed tends to a straight line with the intercept on the LM axis being close to the origin. The best straight line through the points represented by y=a x+b where y is % residual LM, and
x is % residual MPC, for the invention should have a is in the range 0.9 to 1.1, and
b is in the range −10 to 10

In the example the equation is y=0.98x+3.3. The coefficient of correlation is over 0.97. Ideally the relationship would be y=x. A comparison of the one-pot results indicates that these do not have a direct correlation but rather % LM residual is always higher than residual HEMA-PC, often by more than 10%. Thus the monomer feed process meets the requirement of the claim that the mole ratio of the two monomers does not vary throughout the polymerisation by more than 10%, whereas the one-pot method does not satisfy that test.

The results show the residual monomer ratio is substantially constant throughout the polymerisation process in the invention, whereas in the one-pot method one monomer is removed into polymer at a far greater rate than the other, resulting in uneven polymer composition. Polymers formed early on in the progress of the application will have a different composition than those formed late.

EXAMPLE 5

Solutions in Alcohol/Water Mixtures of Novel Copolymer

The copolymer produced in Example 1 was dissolved in mixtures of three different alcohols and water, each at alcohol/water contents in the range 100/0–0/100. The alcohols were methanol (MeOH), ethanol (EtOH) and isopropanol (IPA). The turbidity of the solutions is determined in the same manner as in Example 3.

The results are shown in accompanying FIG. 4.

FIG. 4 indicates that the novel copolymer of the invention has a window of clarity for both isopropanol and ethanol mixtures, though at slightly different alcohol/water levels.

EXAMPLE 6

Coating Performance of 100% Alcohol Solutions of Products of Monomer Starved vs One-Dot Polymerisation The polymer made according to the process of example 1 and the prior art 1:2 copolymer were each dissolved in 100% methanol, ethanol and isopropanol and coated onto substrates for roughness testing. The substrate was glass coverships. It was prepared by sonication in dichloromethane for 10 min. The solutions were 20 mg/ml and were coated by dip-coating and removed at about 3 mm/s, dried at room temperature for 24 hours.

Roughness determinations were carried out by atomic force microscopy in "tapping mode" (trademark) (Digital Instruments, AFM Dimension 3000 model with a Nanoscope III a control unit). The results are shown in table 1 below.

TABLE 1

| Alcohol | Comparative | | Invntion | |
| --- | --- | --- | --- | --- |
| | Rq | Ra | Rq | Ra |
| MeOH | 25.8 | 16.7 | 0.5 | 0.4 |
| EtOH | 67.1 | 49.6 | 5.4 | 4 |
| IPA | 3.4 | 2.6 | 2.2 | 1.7 |

EXAMPLE 7

Coating Performance of Novel Copolymer Solutions in Alcohol/Water Mixtures Compared to 100% Alcohol The polymer produced according to Example 1 is used to provide coatings using the coating process described generally in example 5, from 100% ethanol and isopropanol and from 20:80 alcohol:water (by volume) mixtures. The coatings were subjected to the roughness test of Example 6. The results are shown in the accompanying table.

TABLE 2

| Solvent System | Rq | Ra |
| --- | --- | --- |
| EtOH | 5.4 | 4 |
| EtOH (20%): H$_2$O (80%) | 0.88 | 0.69 |
| IPA | 2.2 | 1.7 |
| IPA (20%): H$_2$O (80%) | 0.93 | 0.66 |

EXAMPLE 8

Surface Wettability

The polymer produced according to Example 1 and the prior art copolymer described in Example 3 were dissolved (at 10 g/l) in a range of solvents systems and coated onto precleaned glass coverslips using the general technique described in Example 6. The coated substrates were subjected to surface wettability testing by determining their static contact angles for a water droplet. The results are shown in Table 3.

TABLE 3

| Polymer | Solvent System | Static Contact Angle | |
| --- | --- | --- | --- |
| | | Mean (θ) | S.D. |
| Invention | MeOH | 45.0 | 4.3 |
| Invention | EtOH | 56.5 | 3.8 |
| Invention | IPA | 77.9 | 14.1 |
| Invention | BuOH | 104.3 | 1.9 |
| Invention | 60:40 H$_2$O:IPA | 36.0 | 3.5 |
| Invention | 80:20 H$_2$O:IPA | 31.3 | 3.8 |
| Invention | 99:1 Hexane:EtOH | 107.3 | 6.3 |
| Invention | 50:50 Hexane:EtOH | 61.0 | 5.1 |
| Comparative | MeOH | 59.0 | 5.1 |
| Comparative | EtOH | 83.2 | 5.6 |
| Comparative | IPA | 62.0 | 8.2 |
| Comparative | BuOH | 100.5 | 7.6 |

BuOH is n-butanol

There was a suggestion of a trend to increasing contact angle as the length of the alkyl component of the alcohol increased. Results from the aqueous alcohol solutions were encouraging, showing a significantly lower static contact angle than for the single-solvent alcohol systems.

EXAMPLE 9

Coating of Blood Filtration Material

A leucocyte filter manufactured by Pall Corp. and comprising a fabric formed of microfine polyethylene teraphthalate fibres was coated by being dipped into 500 ml 5 g/l solutions of the polymer of Example 1 in a 70:30 water IPA mixture and in neat IPA. The filter materials were dried for several hours. The coated filters were tested for the critical wetting surface tension (CWST) by placing single drops of a series of standard solutions having known surface tension and observing whether the drops completely wet the surface. The surface energy was reported as the mean of the surface tensions of the solution having the highest surface tension which does not wet and the solution having the lowest surface tension which does wet the filter. The results are compared to the uncoated filter tested in the same way as compared to the uncoated filter. The CWST of the uncoated filter was 50 dynes/cm, the filter coated with a polymer coated from neat IPA was increased to 58 dynes/cm and the filter coated from the aqueous alcohol solution was increased to 65 dynes/cm.

Furthermore the coated filters were contacted with drops of one of the test solutions, which had a tension of 56.5 dynes/cm and the average time taken for the solution to soak into the filter. The filter coated from the aqueous alcohol solution absorbed the solution in about one third the time of the filter coated from the neat IPA solution.

Upon contact of the coated filters with blood both coated filters had adequate resistance to thrombus formation and cell deposition determined after contact with blood, and using scanning electron microscopy to observe the blood contacted surface.

EXAMPLE 10

Solutions in Alcohol:Alkane Mixtures

The polymer produced as in Example 1 and the comparison polymer formed by the one-pot method referred to in Example 3 were tested for their dissolution characteristics in hexane:alcohol mixtures, at a polymer concentration of 10 g/l. The alcohols used were ethanol and isopropanol. It was found that, for the novel polymer, 1.2% ethanol or 4.6% isopropanol was needed to dissolve the polymer completely (produce a visually clear solution). For the prior art polymer 2.2% ethanol or 6.3% isopropanol was needed. These differences are significant, and the lower alcohol level is expected to have advantages where a substrate to be coated is, for instance, a polyurethane.

EXAMPLE 11

Effect of Changing Length of Alkyl Chain in Comonomer

Example 1 was repeated, by using, in place of dodecyl methacrylate, the same weight of other alkyl methacrylates. 0.1 g of the polymers produced were then dissolved to form a 3 ml solution in alcohol, the alcohol and chain length of the alkyl being as specified in Table 4. To the alcoholic polymer solutions water was added with shaking and the aqueous alcoholic solutions observed to determine whether cloudiness appeared immediately upon addition of a small volume of water. If so, more water was added up to a total volume of about 10 ml, to determine whether the cloudiness dissipated, that is whether the polymers exhibited a window of clarity at some water alcohol ratios. In Table 4, a tick (✓) means that a window of clarity is exhibited, and a dash (-) means the polymer is soluble at all water:alcohol ratios tested. The tick in parentheses means the cloudiness dissipated only upon warming the 10 ml solution.

TABLE 4

| Alcohol | Alkyl Chain Length in Comonomer | | | | | | |
|---|---|---|---|---|---|---|---|
| | C1 | C2 | C4 | C6 | C8 | C12 | C16 |
| MeOH | — | — | — | — | — | — | — |
| EtOH | — | — | — | — | — | ✓ | ✓ |
| n-ProH | ✓ | — | — | ✓ | ✓ | ✓ | ✓ |
| IPA | (✓) | ✓ | — | ✓ | ✓ | ✓ | ✓ |

EXAMPLE 12

Changing Ratio of Monomers

The polymerisation process of Example 1 was repeated but using a 2:1, 1:1 and 1:4 mole ratio of zwitterionic monomer (HEMA-PC) to hydrophilic comonomer (LM). The 2:1 and 1:1 copolymers are relatively water-soluble and so do not form stable coatings on surfaces to be used in aqueous environments. The polymers did exhibit similar characteristics as the 1:2 copolymer in terms of being soluble in neat isopropanol. The 2:1 and 1:1 and 1:2 copolymers were soluble in methanol and addition of water to the methanol solutions did not make them cloudy. Upon addition of water to the 1:4 copolymer solution in ethanol, isopropanol and n-propanol precipitated the polymer, the precipitation being irreversible even upon adding further water. The polymer solvent combination shows no window similar to that, illustrated in FIG. 1. For the 2:1, 1:1 and 1:2 copolymers addition of water to the methanolic solutions did not turn the solutions cloudy. For solutions of those three polymers in ethanol, isopropanol and n-propanol, addition of water initially results in cloudiness, but this cloudiness dissipates upon increasing the amount of water.

If the dodecyl methacrylate is replaced by n-butyl methacrylate at the same weight ratios different solubility characteristics are exhibited as compared to the dodecyl methacrylate derived analogues, which may be a consequence of the fact that those polymers are likely to have a greater degree of blockiness -comprising longer blocks of alkyl methacrylate-derived units, due to the higher mole content of butylmethacrylate monomer in the mixture as compared to dodecylmethacrylate.

What is claimed is:

1. A polymerisation process conducted in a reaction vessel in which ethylenically unsaturated monomers consisting substantially only of:

a) 1 part by mole zwitterionic monomer of the general formula I in which n is 2 to 24;

m is 0 to 20;

of the groups $R^1$, one may be methyl or hydrogen and the rest are all hydrogen; and X is a zwitterionic group; and b) 1 to 10 parts by mole hydrophobic comonomer of the general formula II in which p is 1 to 24;

are copolymerised in solution in a solvent system in which the monomer mixture and the polymer are soluble and which comprises at least one solvent; comprising the steps:

adding said at least one solvent to the reaction vessel;

adding a radical initiator to the reaction vessel;

feeding the monomers constantly over a monomer feed phase into the reaction vessel under conditions at which polymerisation takes place, at a predetermined monomer feed rate whereby the molar ratio of zwitterionic monomer to hydrophobic comonomer in the reaction vessel is maintained substantially constant (±10%) throughout the monomer feed phase; and polymerising the monomers to produce zwitterionic polymer product.

2. A process according to claim 1 in which m is 0, and n is in the range 2 to 4.

3. A polymerisation process according to claim 2 in which n is 2.

4. A process according to claim 1 in which p is at least 4.

5. A polymerisation process according to claim 4 in which p is in the range 6 to 18.

6. A polymerisation process according to claim 5 in which p is 12.

7. A process according to claim 1 in which $C_pH_{2p+1}$ is a straight chain group $(CH_2)_pH$.

8. A process according to claim 1 in which X has the general formula III in which the moieties $A^2$ and $A^3$ which are the same or different, are selected from the group consisting of —O—, —S—, —NH— and a valence bond; and $W^+$ is a group comprising an ammonium, phosphonium or sulphonium cationic group and a group linking the anionic and cationic moieties which is a $C_{1-12}$-alkanediyl group.

9. A polymerisation process according to claim 8 in which $W^+$ is a group of formula $W^1$—$N^+R^2{}_{23}$, —$W^1$—$P^+R^3{}_3$, —$W^1$—$S^+R^3{}_2$ or —$W^1$-Het$^+$ in which:

$W^1$ is selected from the group consisting of alkanediyl of 1 to 6 carbon atoms optionally containing one or more ethylenically unsaturated double or triple bonds, arylene, alkylene arylene, arylene alkylene, alkylene aryl alkylene, cycloalkanediyl, alkylene cycloalkyl, cycloalkyl alkylene and alkylene cycloalkyl alkylene, which group $W^1$ optionally contains one or more fluorine substituents and/or one or more functional groups; and either the groups $R^2$ are the same or different and each is selected from the group consisting of hydrogen, alkyl of 1 to 4 carbon atoms, and aryl, or two of the groups $R^2$ together with the nitrogen atom to which they are attached form an aliphatic heterocyclic ring containing from 5 to 7 atoms, or the three groups $R^2$ together with the nitrogen atom to which they are attached form a fused ring structure containing from 5 to 7 atoms in each ring, and optionally one or more of the groups $R^2$ is substituted by a hydrophilic functional group;

the groups $R^3$ are the same or different and each is $R^2$ or a group $OR^2$, where $R^2$ is as defined above; and Het is an aromatic nitrogen-, phosphorus- or sulphur-containing ring.

10. A process according to claim 8 in which X has the general formula IV:

where the groups $R^4$ are the same or different and each is hydrogen or $C_{1-4}$ alkyl, and q is in the range of from 1 to 4.

11. A polymerisation process according to claim 10 in which each $R^4$ is methyl.

12. A process according to claim 1 in which the solvent system comprises a mixture of an alcohol and an ester.

13. A polymerisation process according to claim 12 in which the alcohol is propan-2-ol and the ester is propan-2-yl acetate.

14. A process according to claim 1 in which one solution containing both of the monomers is fed to the reaction vessel.

15. A process according to claim 1 in which the contents of the reaction vessel are at a raised temperature compared to the monomers prior to being fed to the vessel during said monomer feed phase.

16. A process according to claim 1 in which initiator is fed to the polymerisation vessel throughout the monomer feed phase, such that the ratio of monomer to initiator remains substantially constant throughout substantially the entire monomer feed phase.

17. A process according to claim 1 in which zwitterionic polymer product is recovered by i) mixing the product mixture with a precipitation liquid which is a non-solvent for the polymer to produce precipitated polymer and ii) separating precipitated polymer from dissolved by-products in product solvent.

18. A polymerisation process according to claim 17 in which the mixing and separating are conducted substantially without prior removal from the product mixture of any polymerisation solvent.

19. A process according to claim 17 in which said mixing is carried out by concurrent addition of the product mixture and the precipitation liquid to a recovery vessel over a period of time.

20. A process according to claim 17 in which the separated precipitated polymer is redissolved in a solvent comprising selected from the group consists of $C_{1-4}$-alcohols, mixtures of $C_{1-4}$ alcohols, mixtures of a $C_{1-4}$ alcohol with a miscible $C_{5-12}$-alkane and mixtures of a $C_{1-4}$ alcohol and water.

21. A process according to claim 1 in which the product polymer has an average molecular weight (Mn) in the range $(2\times10^4)$ to $10^6$.

22. A solution of a copolymer formed of
a) 1 part by mole zwitterionic monomer of the general formula I in which n is 2 to 24;

m is 0 to 20;

of the groups $R^1$, one may be methyl or hydrogen and the rest are all hydrogen; and X is a zwitterionic group; and b) 1.5 to 3 parts by mole hydrophobic comonomer of the general formula II in which p is 1 to 24;

said copolymer having a propan-2-ol:water solubility characteristic such that the copolymer is substantially insoluble in mixtures of 0–5% propan-2-ol/100–95% water, substantially wholly soluble at 20–40% propan-2-ol/40–60% water and at 100% propan-2-ol and substantially insoluble at 60–90% propan-2-ol/40–10% water, said solution comprising copolymer at a concentration in the range 1–200 mg/ml and a solvent system comprising a mixture of miscible liquids each having a vapour pressure of at least 0.1 kPa at 25° C., wherein the solution has a turbidity of less than 50 NTU, and the solution consists essentially of said copolymer and the solvent system.

23. A solution according to claim 22 in which the solvent system comprises a mixture of an alcohol and water.

24. A solution according to claim 23 wherein the alcohol is a $C_{1-10}$ to alkanol.

25. A solution according to claim 24 in which the alcohol is ethanol or propan-2-ol.

26. A solution according to claim 22 in which m is 0, n is in the range of from 2 to 4, p is in the range 8 to 16, and X has the general formula IV:

where the groups $R^4$ are the same or different and each is hydrogen or $C_{1-4}$ alkyl, and q is in the range of from 1 to 4.

27. A solution according to claim 22 in which the copolymer is water insoluble.

28. An aqueous-alcoholic solution of a copolymer formed from a) 1 part by mole of zwitterionic monomer of the general formula I in which n is 2 to 24;

m is 0 to 20;

of the groups $R^1$, one may be methyl or hydrogen and the rest are all hydrogen; and X is a zwitterionic group; and b) 1.5 to 10 parts by mole of a hydrophobic comonomer of the general formula II in which p is 1 to 24;

dissolved in a solvent system consisting of a mixture of an alcohol and water in a volume ratio in the range 10:1 to 1:5, the alcohol and its level being selected such that a 20 mg/ml solution of the copolymer has a turbidity of less than 50 NTU.

29. An aqueous-alcoholic solution according to claim 28 which has a turbidity value less than 20 NTU.

30. An aqueous-alcoholic solution according to claim 28 in which the alcohol is a $C_{1-10}$ alkanol.

31. An aqueous-alcoholic solution according to claim 30 in which the alcohol is propan-2-ol.

32. An aqueous-alcoholic solution according to claim 28 in which the proportion of water in the solvent system is at least 50%.

33. An aqueous alcoholic solution according to claim 28 in which m is 0, n is in the range of from 2 to 4, p is in the range 8 to 16, and X has the general formula IV:

where the groups $R^4$ are the same or different and each is hydrogen or $C_{1-4}$ alkyl, and q is in the range of from 1 to 4.

34. A coating solution comprising a copolymer formed from a) 1 part by mole of a zwitterionic monomer of the general formula I in which n is 2 to 24;

m is 0 to 20;

of the groups $R^1$, one may be methyl or hydrogen and the rest are all hydrogen; and X is a zwitterionic group; and b) 1–10 parts by mole of a hydrophobic comonomer of the general formula II in which p is 1 to 24;

in molar ratios in the range 1:(1–10) in a coating solvent system comprising a mixture of a $C_{5-10}$-alkane and a $C_{1-10}$-alkanol in a volume ratio in the range 1:(0.1 to 10).

35. A coating solution according to claim 34 in which the alkane and alkanol are provided in ratios in the range (1–5):(5–1).

36. A coating solution according to claim 34 in which m is 0, n is in the range of from 2 to 4, p is in the range 8 to 16, and X has the general formula IV:

IV where the groups $R^4$ are the same or different and each is hydrogen or $C_{1-4}$ alkyl, and q is in the range of from 1 to 4.

37. A coating solution according to claim 34 in which the alkane is selected from the group consisting of cyclohexane, n-hexane and n-heptane.

38. A coating solution according to claim 34 in which the alkanol is selected from the group consisting of methanol, ethanol, propan-1-ol, propan-2-ol, butan-1-ol, butan-2-ol, methyl-1-propanol, methyl-2-propanol, pentan-2-ol, pentan-1-ol, hexan-1-ol and hexan-2-ol.

39. A coating solution according to claim 34 in which the copolymer is water-insoluble.

40. A coating process comprising i) coating onto a substrate a coating solution comprising a copolymer formed from a) 1 part by mole of a zwitterionic monomer of the general formula I

I in which n is 2 to 24;

m is 0 to 20;

of the groups $R^1$, one may be methyl or hydrogen and the rest are all hydrogen; and X is a zwitterionic group; and b) 1–10 parts by mole of a hydrophobic comonomer of the general formula II

II in which p is 1 to 24;

in molar ratios in the range 1:(1–10) in a coating solvent system comprising a mixture of a $C_{5-10}$-alkane and a $C_{1-10}$-alkanol in a volume ratio in the range 1:(0.1 to 10); and ii) removing said $C_{5-10}$ alkane and said $C_{1-10}$ alkanol.

41. A coating process according to claim 40 in which said removing is conducted under reduced pressure.

42. A coating process according to claim 40 in which said removing is conducted under raised temperature.

* * * * *